United States Patent [19]
Abendschein

[11] 3,776,668
[45] Dec. 4, 1973

[54] OIL SEPARATOR FOR REFRIGERATION COMPRESSOR

[75] Inventor: Frederic H. Abendschein, Columbia, Pa.

[73] Assignee: Borg-Warner Corporation, Chicago, Ill.

[22] Filed: Feb. 18, 1972

[21] Appl. No.: 227,513

[52] U.S. Cl. .............................................. 418/97
[51] Int. Cl. ........................ F01c 21/04, F04c 29/02
[58] Field of Search .................. 418/89, 97, 98, 99, 418/100; 55/DIG. 37

[56] References Cited
UNITED STATES PATENTS

| | | | |
|---|---|---|---|
| 2,361,146 | 10/1944 | Montelius | 418/97 X |
| 2,833,373 | 5/1958 | Custer | 55/DIG. 37 |
| 2,983,435 | 5/1961 | Barnell | 418/98 X |
| 3,478,957 | 11/1969 | Harlin et al. | 418/89 |

Primary Examiner—Carlton R. Croyle
Assistant Examiner—Richard E. Gluck
Attorney—Donald W. Banner et al.

[57] ABSTRACT

An improved oil separator, particularly adapted for use with a refrigerant compressor in which oil must be separated from the refrigerant vapor. The oil separator of the present invention is characterized by a oil coalescing screen arranged in the flow path of discharge gas delivered from the discharge port and a novel arrangement of baffles which reduce the velocity of the discharge gas before it passes through the screen and prevent re-entrainment of oil in the discharge gas.

3 Claims, 3 Drawing Figures

PATENTED DEC 4 1973 3,776,668

OIL SEPARATOR FOR REFRIGERATION COMPRESSOR

BACKGROUND AND SUMMARY OF THE INVENTION

The subject invention relates generally to oil separators, and more particularly to an improved oil separator which is especially adapted for use in a rotary type automotive compressor.

The present invention may be regarded as an improvement over the compressor oil separation systems shown and described in U.S. Pat. No. 3,478,957 issued to Harlin et al on Nov. 18, 1969 and in co-pending U.S. application Ser. No. 160,694, filed Aug. 8, 1971. In the compressor described in the Harlin patent, an oil coalescing screen extends across the chamber into which the discharge gas is delivered. The gas flows through a tube directly to a chamber formed at one end of the compressor shell and then passes through the screen to a discharge gas line extending into the chamber on the opposite side of said screen. While this construction represented an important improvement in the compressor oil separating art, it has been found that under some conditions the surface of the oil lying in the bottom of the shell can be churned up by the turbulent action of the discharge gas as it is delivered into the first chamber. An important feature of the present invention is a provision of a series of baffles which tend to diffuse the gas as it flows into the chamber and thus reduces the turbulence of the gas flow. The tendency of the oil to froth and foam, which action increases the entrainment of oil in the discharge gas stream and the occlusion of vapor in the lubricating oil, is substantially reduced.

DETAILED DESCRIPTION OF THE PREFERRED EMBODIMENT

Figure 1:
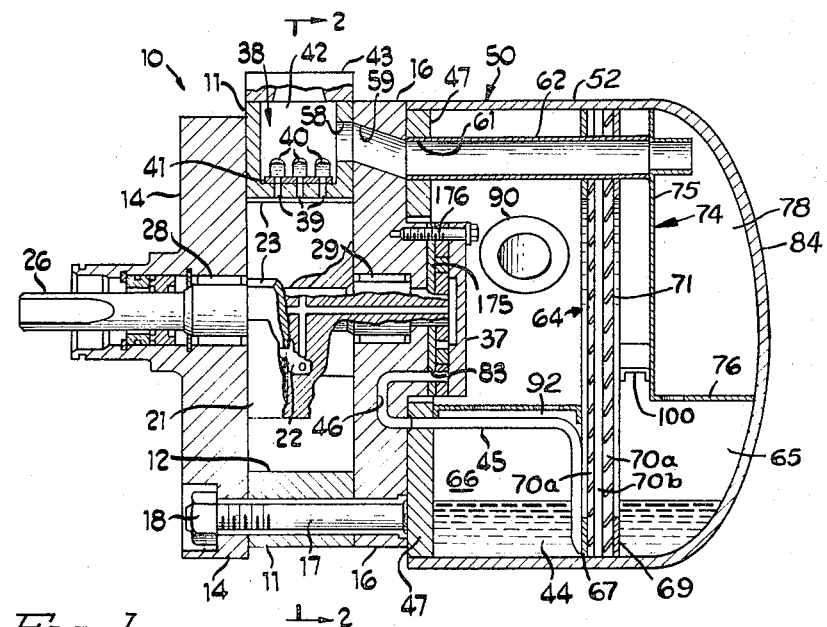
FIG. 1 is a cross-section view of a compressor and oil separator constructed in accordance with the principles of the present invention.

The disclosed compressor has a casing 10 which includes a cylinder structure 11 having a cylindrical bore or wall 12 extending therethrough, a front bearing plate 14, and a rear bearing plate 16, all secured together by a series of six studs 17 and nuts 18, only one of said nuts being shown in FIG. 1. Casing 10 provides a closed cavity formed by cylindrical wall 12 and bearing plates 14 and 16 which serve as spaced parallel end walls for the cavity. The rotor assembly 20, eccentrically positioned within that cylindrical cavity, includes a slotted rotor 21 having a series of four slots 22 arranged circumferentially and each extending along a plane parallel to the rotor's axis. The closed end of each slot, for convenience, may be referred to as the bottom end. Each of a series of four reciprocating vanes 23 is slidably mounted in a respective one of slots 22. The eccentric positioning of rotor assembly 20 within cylindrical wall 12 is obtained by rotatably mounting rotor 21 on an axis offset with respect to the axis of wall 12. Such eccentric mounting creates a crescent-shaped compression chamber 24 between rotor 21, wall 12, and the two end walls or bearing plates 14 and 16.

Rotor 21 has a drive shaft 26 journalled in bearings 28 and 29 affixed to plates 14 and 16 respectively. The left end of shaft 26 (as viewed in FIG. 1) projects outwardly of front bearing plate 14 to facilitate driving of that shaft. Since the illustrated embodiment is especially adapted for automotive use, it is contemplated that a pulley and clutch mechanism (not shown) would be coupled to the left end of shaft 26 to permit the compressor to be driven by the engine fan belt or accessory drive belt of the automobile. Of course, the disclosed compressor may be employed in many different environments and may be used in other than refrigeration or air-conditioning systems to compress a variety of different gaseous fluids. Whatever the driving means, it may conveniently be coupled to drive shaft 26.

Figure 2:
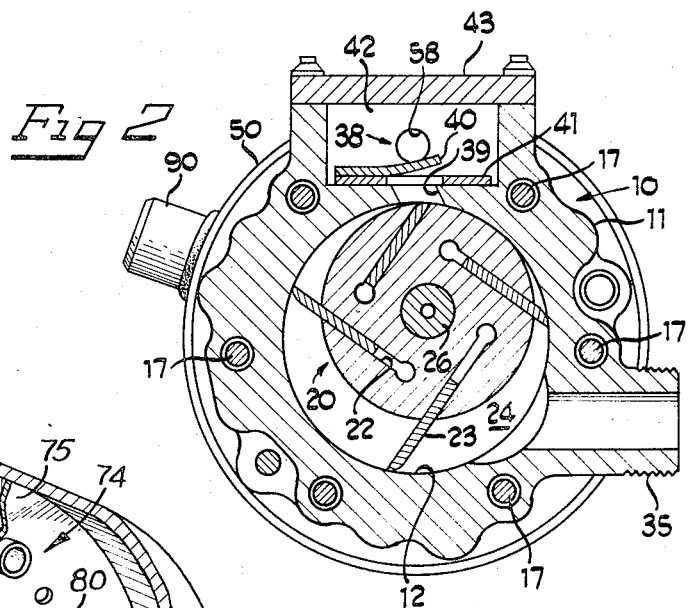
FIG. 2 is a cross-sectional view taken along the plane of line 2—2 of FIG. 1.

The compressor is designed to operate when rotor assembly 20 revolves in a clockwise direction as viewed in FIG. 2. Under all operating conditions, vanes 23 will be forced outwardly to their positions shown in FIG. 2 in order to firmly bear against cylindrical wall 12 and establish a fluid-tight, sealed connection thereto. In operation, suction gas from the evaporator of the automotive air-conditioning system is admitted to an inlet 35 formed in cylinder structure 11. As is illustrated in FIG. 2, this suction gas flows into the suction portion of compression chamber 24. As the rotor is driven clockwise, the suction gas is trapped between two adjacent vanes 23 and carried forward toward the discharge area. As this occurs, the volume between the adjacent vanes is reduced thereby resulting in a corresponding increase in pressure of the gas. A discharge valve assembly 38 is located in the discharge zone for assuring proper compression of the gases issuing from a series of three outlet or discharge ports 39, bored in cylinder structure 11, and for preventing reverse flow of gases back into compression chamber 24. The valve assembly 38 is of the reed type comprising the three valve reeds 40 held in place by a valve guard or stop 41. The compressed gas emanating from ports 39 flows into a chamber 42 defined by cylinder structure 11 and a cover plate 43.

Oil for lubricating and sealing the compressor is supplied from the oil sump 44 through oil pick-up tube 45 and passage 46. A small oil pump 37, such as described in aforementioned co-pending application Ser. No. 160,694, or similar means, may be used to feed the oil to the underside of the vanes or to some other suitable location in the compressor.

Due to the use of oil for sealing, the discharge gas flowing through valve assembly 38 and into chamber 42 is heavily laden with oil. This entrained oil must be removed from the gas because substantial quantities of oil in the discharge gas reduce the heat transfer in the condenser and evaporator. In addition, it is much more difficult to supply a sufficient amount of oil to the compression chamber to attain the necessary sealing between the rotor and chamber surfaces if the oil is allowed to circulate around the system.

Oil separation in the disclosed compressor takes place within shell 50, said shell including a cylindrical side wall 52 and an end wall 84. The cylindrical side wall of the shell closely conforms to the geometry of the rear bearing plate 16 and is secured thereto by the mounting ring 47. A passageway formed by bores 58, 59 and 61 in cylinder structure 11, bearing plate 16 and mounting ring 47, respectively, together with tube 62, fluidly interconnects chamber 42 to chamber 65 the extreme end of shell 50. Tube 62 extends through an oil coalescing screen assembly 64 and has its free end supported by a baffle assembly 74 to be described in more detail below. The periphery of screen assembly 64 has the same contour as that of the shell so that its edges fit against the internal diameter of the shell when held in place by screen assembly support members 67, 69. In this way, screen assembly 64 constitutes a partition to define two distinct chambers 65 and 66 within shell 50.

Figure 3:
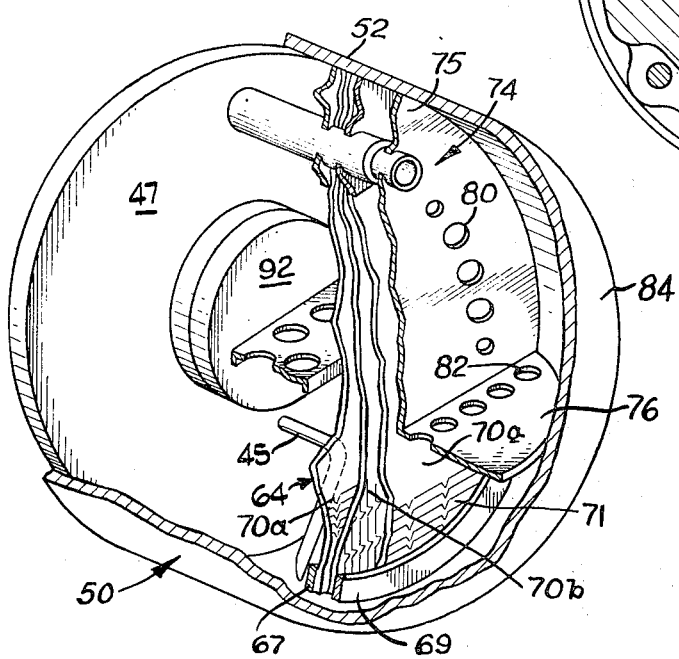
FIG. 3 is a partial perspective view with portions broken away and shown in section.

As best shown in FIGS. 3 and 4, the oil separating screen assembly 64 comprises a plurality of discs 70a, 70b each formed of expanded sheet metal. It is understood that expanded sheet metal means a thin-gauge metallic sheet material in which slit-like perforations are formed, all extending generally in the same direction. The entire sheet then is stretched in the direction normal to that of the slits to form a series of louvers 71. In a preferred embodiment, the louvers in the outer discs 70a are oriented in a NE to SW direction (as viewed in FIG. 1). The center disc 70b is arranged with the major dimension of the louvers vertical and the diverting direction (with respect to gas flow) being generally from left to right as viewed from the top (as oriented in FIG. 1). This particular arrangement of the louvers has been found to be most important in reducing the turbulence in chamber 66.

This construction also provides a coalescing medium which efficiently separates the entrained oil from the discharge gas. The oil separating screen assembly 64 is secured by a pair of support members 67, 69, which are respectively spot-welded or otherwise secured to the baffle assembly 74 by bracket 100.

An important feature of the invention is the baffle assembly 74 into which the discharge gas is first directed. This baffle assembly, which is welded to the shell 50 along its peripheral edge has a vertical portion 75, through which the discharge gas tube 62 extends, and a horizontal portion 76 at the bottom edge, all cooperating with the end of the shell to form a chamber 78. Welding is extremely important to prevent gas and oil from leaking around the baffle. Looking now at FIG. 3, it will be noted that a series of apertures 80 are formed in a generally circular pattern extending around the periphery of the baffle vertical portion 75 at a position approximately intermediate the edge and the center thereof. The horizontally extending portion 76 of the baffle also has a series of oil drain openings 82 extending along the edge thereof.

The oil-discharge gas mixture discharges through tube 62 into chamber 78 where it strikes the closed end wall 84 of shell 50. Most of the oil is separated at this stage with the liberated oil running down the end wall 84 through drain holes 82 and into the sump 44. The overall effect of baffle 74 is to drastically slow down the flow of the gas as it flows from chamber 78 defined by the baffle toward oil screen assembly 64. The spacing of the apertures throughwhich the gas can flow out of the chamber is such that the gas is evenly distributed into a relatively large volume. The gas then flows through the oil coalescing screen assembly 64, where additional oil is coalesced onto the screen, and then from chamber 66 out through the main discharge gas connection 90, which is located at the side of the shell, to the condenser (not shown).

Another feature of the invention is the provisions of a baffle 92 between the oil pick-up tube 45 and the discharge outlet 90. In automotive applications, movement of the vehicle often causes the oil in sump 44 to slosh back and forth, tending to re-entrain oil in the discharge gas. Baffle 92 effectively operates to reduce this source of re-entrainment.

While this invention has been described in connection with a certain specific embodiment thereof, it is to be understood that this is by way of illustration and not by way of limitation; and the scope of the appended claims should be construed as broadly as the prior art will permit.

What is claimed is:

1. A refrigerant compressor comprising a housing having a compression cavity provided therein, said housing including a bearing plate forming one side wall of said compression cavity; suction and discharge ports respectively communicating with said compression cavity; a rotor received in said compression cavity adapted to compress a gaseous refrigerant introduced into said cavity at said suction port and deliver said refrigerant, together with lubricating fluid entrained therein, at a higher pressure through said discharge port; means defining a fluid passage communicating with said discharge port and extending through said bearing plate; a fluid-tight shell connected to said housing and extending from said bearing plate in a generally axial direction, said shell having a generally cylindrical peripheral wall and an end wall spaced from said bearing plate, the lower portion of said shell providing a reservoir for said lubricating fluid; means defining a baffle assembly adjacent said end wall, said assembly including a vertical portion contoured to the peripheral wall of said shell and a horizontal extension secured in fluid-tight relation to said end wall, said horizontal extension being spaced above the normal level of said lubricating fluid in said shell; a conduit interconnecting said fluid passage with the upper portion of said baffle assembly; means defining a series of apertures extending in a generally circular pattern through the vertical portion of said baffle assembly; means defining an additional series of apertures in said horizontal extension; and a gas discharge outlet in said shell peripheral wall located between said bearing plate and said vertical portion, whereby said discharge gas is delivered into the upper portion of said baffle assembly and flows through said apertures toward the discharge conduit.

2. Apparatus as defined in Claim 1 including a plurality of oil coalescing screens generally vertically disposed within said shell and located between said gas discharge outlet and said baffle assembly, whereby said discharge gas is constrained to flow through said screens before flowing out through said outlet.

3. Apparatus as defined in claim 1 including a baffle positioned between the normal level of lubricating fluid in said sump and said gas discharge outlet to retard the re-entrainment of lubricating fluid into the stream of discharge gas flowing through said outlet.

* * * * *